United States Patent [19]
Deguchi et al.

[11] Patent Number: 6,008,502
[45] Date of Patent: Dec. 28, 1999

[54] DIAMOND ELECTRON EMITTING DEVICE HAVING AN INSULATIVE ELECTRON SUPPLY LAYER

[75] Inventors: Masahiro Deguchi, Osaka; Akio Hiraki, Kochi; Toshimichi Ito; Akimitsu Hatta, both of Osaka; Nobuhiro Eimori, Aichi; Makoto Kitabatake, Nara, all of Japan

[73] Assignee: Matsushita Electric Industrial Co., Ltd., Osaka, Japan

[21] Appl. No.: 08/945,877

[22] PCT Filed: Mar. 26, 1997

[86] PCT No.: PCT/JP97/01031

§ 371 Date: Nov. 3, 1997

§ 102(e) Date: Nov. 3, 1997

[87] PCT Pub. No.: WO97/36309

PCT Pub. Date: Oct. 2, 1997

[30] Foreign Application Priority Data

Mar. 27, 1996 [JP] Japan .................................. 8-072734

[51] Int. Cl.$^6$ .............................. H01L 29/06; H01L 29/12
[52] U.S. Cl. ................................................ 257/10; 257/77
[58] Field of Search ..................... 257/10, 77; 313/346 R

[56] References Cited

U.S. PATENT DOCUMENTS

| | | | |
|---|---|---|---|
| 5,256,888 | 10/1993 | Kane | 257/77 |
| 5,631,196 | 5/1997 | Kane et al. | 438/20 |
| 5,670,788 | 9/1997 | Geis | 257/10 |
| 5,703,380 | 12/1997 | Potter | 257/10 |

FOREIGN PATENT DOCUMENTS

| | | |
|---|---|---|
| 0 718 864 | 6/1996 | European Pat. Off. . |
| 4-67528 | 3/1992 | Japan . |
| 6-187902 | 7/1994 | Japan . |
| 7-94077 | 4/1995 | Japan . |
| 7-272618 | 10/1995 | Japan . |
| 8-264862 | 10/1996 | Japan . |

*Primary Examiner*—John Guay
*Attorney, Agent, or Firm*—Merchant & Gould, P.C.

[57] ABSTRACT

The present invention provides an electron emitting device for efficiently emitting electron beams by applying a forward bias to an MIS, pn, and a pin structure using a diamond layer so as to supply electrons from an electron supply layer to a p-type diamond layer. Furthermore, the present invention provides a method for easily and efficiently performing important production processes for producing a highly efficient electron emitting device having a diamond layer and controlling a surface state of the diamond layer. A multilayer structure including an electrode layer, an electron supply layer and a diamond layer is used as the structure thereof. Alternatively, the electron affinity state of the surface of the diamond layer is arbitrarily controlled by a method such as ultraviolet ray irradiation.

41 Claims, 10 Drawing Sheets

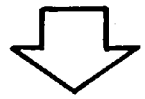

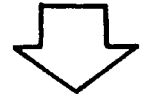

DIAMOND ELECTRON EMITTING DEVICE HAVING AN INSULATIVE ELECTRON SUPPLY LAYER

TECHNICAL FIELD

The present invention relates to an election emitting device for emitting electron beams. In particular, the present invention relates to an electron emitting device including a diamond layer and a method for producing the same.

BACKGROUND ART

A conventional electron emitting device has employed a hot cathode for extracting electrons by heating a material such as tungsten (W) or the like to a high temperature. In recent years, a small electron emitting device of a cold cathode type has been attracting attention as an electron beam source to replace such an electron gun. Examples of this type of electron emitting device include that of a field emission type and an avalanche amplification type employing a pn and a Schottky junction.

In the electron emitting device of the field emission type, electrons are emitted from a cone-shaped emitter portion made of metals such as silicon (Si), molybdenum (Mo) or the like by applying a voltage to a gate electrode so as to apply an electric field. Thus, this type of electron emitting device has an advantage of being miniaturized using miniaturization techniques.

On the other hand, in the electron emitting device of the avalanche amplification type employing a semiconductor material, hot electrons are emitted from an emitter portion by applying reverse bias so as to cause avalanche amplification.

The characteristics required for a material for such an electron emitting device are as follows: 1) readily emitting electrons with a relatively small electric field, i.e., having a small electron affinity; 2) having a chemically stable surface for an emitter portion in order to maintain stable electron emission; 3) having excellent abrasion resistance and heat resistance.

In view of the above-mentioned points, in the field emission type device of the prior art, an amount of an emitted current has a large dependence on the shape of the emitter portion, thus making the production and the control thereof excessively difficult. In addition, it has a problem in surface stability of the used material. Furthermore, in this system, an individual device is an electron emission source at a point, and it is difficult to obtain electron emission flow in a plane shape.

In the avalanche amplification type, since it is generally necessary to apply a large current amount to the device, the device generates heat. Thus, the electron emission characteristic becomes unstable, or the life time of the device is shortened. Furthermore, in the avalanche amplification type, a cesium layer or the like is provided on the surface of the emitter portion so as to reduce a work function amount in the electron emission portion. However, since a material having a small work function such as cesium is chemically unstable, the state of the surface is not stable, i.e., the electron emission characteristic is not stable. As described above, the materials and the structures that have been conventionally used are not sufficient to provide the characteristics required for the electron emitting device.

On the other hand, diamond is a semiconductor material having a wide band gap (5.5 eV), and the characteristics thereof are suitable for a material for the electron emitting device due to its high hardness, abrasion resistance, high thermal conductivity and chemical inactivity. In addition, diamond can have a higher energy level of the conduction band edge than the energy level of vacuum by controlling the state of the surface thereof. In other words, diamond can have the state of negative electron affinity. More specifically, when electrons are injected to the conduction band of a diamond layer, the electrons are readily emitted. Furthermore, in general, diamond can be easily formed by a chemical vapor deposition (CVD) method using a gas containing carbon species and a hydrogen gas as source gas, and has an advantage in production thereof. However, since the Fermi level of a metal is significantly different from the energy level of the conduction band of diamond, it is not easy to supply electrons to the conduction band of the diamond simply by contacting an electrode with the diamond layer. A method or a mechanism for efficiently supplying electrons to the conduction band of the diamond has not been studied in detail, and an electron emitting device has not been realized so far that can supply electrons to the conduction band of the diamond and allow the electrons to be emitted.

DISCLOSURE OF INVENTION

It is an object of the present invention to provide an electron emitting device for efficiently emitting electron beams in order to solve the above-mentioned problems in the prior art. It is another object to provide an electron emitting device for easily emitting electron beams by forming a structure interposing (laminating) at least an electron supply layer and a diamond layer between two different electrode layers.

In order to achieve the above-mentioned objects, the electron emitting device of the present invention formed using a diamond layer is characterized by having a multilayer structure including an electrode layer, an electron supply layer and a diamond layer, and supplying electrons from the electron supply layer to the diamond layer.

It is preferred that the electron emitting device have a MIS (metal-insulator-semiconductor) structure including the electrode layer made of a metal, an insulating layer included in the electron supply layer and a p-type diamond layer included in the diamond layer, and supply electrons to the p-type diamond layer by applying a forward bias to the MIS structure.

Furthermore, in the electron emitting device, it is preferred to supply a forward bias to a pn structure including the electrode layer made of a metal, an n-type semiconductor layer included in the electron supply layer, and a p-type diamond layer included in the diamond layer.

Furthermore, in the electron emitting device, it is preferred to supply a forward bias to a pin structure including the electrode layer made of a metal, an n-type semiconductor layer and an i-type semiconductor layer included in the electron supply layer, and a p-type diamond layer included in the diamond layer.

Furthermore, in the electron emitting device, it is preferred that the diamond layer have a thickness of 5 $\mu$m or less. More preferably, the thickness of the diamond is in the range from 0.05 $\mu$m to 1 $\mu$m.

Furthermore, it is preferred that the diamond layer include at least a p-type diamond layer. Furthermore the electrical resistivity of the p-type diamond layer is $1 \times 10^4 \Omega \cdot cm$ or less. More preferably, it is preferred that the electrical resistivity of the p-type diamond layer is in the range from $1 \times 10^{-2} \Omega \cdot cm$ to $1 \times 10^2 \Omega \cdot cm$.

Next, a method for producing the electron emitting device of the present invention is characterized by forming a diamond thin film layer on a substrate material by a chemical vapor deposition (CVD) method.

In the method, it is preferred that the diamond layer have a thickness of 1 μm or less. More preferably, the thickness of the diamond layer is in the range from 0.05 μm to 1 μm.

In the method, after the diamond layer is formed on a substrate material by the CVD method, it is preferred to etch the diamond layer to a predetermined thickness or smaller, starting from at least one face selected from the face on the side of the substrate material of the diamond layer and the face on the side of the surface of the diamond layer. The predetermined thickness is preferably in the range from 0.05 μm to 1 μm.

In the method, after the diamond layer is formed, it is preferred to irradiate a predetermined region of the diamond layer with ultraviolet rays having a wavelength of 200 nm or less, more preferably in the range from 100 nm to 200 nm.

In the method, after the diamond layer is formed, it is preferred to expose a predetermined region of the diamond layer to a plasma obtained from a gas including hydrogen.

In the method, after the diamond layer is formed, it is preferred to expose a predetermined region of the diamond layer to a plasma obtained from a gas including oxygen.

In the method, after the diamond layer is formed, it is preferred to expose the heated diamond layer to a gas including hydrogen.

In the method, after the diamond layer is formed, it is preferred to expose the heated diamond layer to a gas including oxygen.

BEST MODE FOR CARRYING OUT THE INVENTION

As described in the Background Art section, diamond has a negative electron affinity, and thus is suitable for a material for an electron emitting device. However, in order to emit electrons, it is necessary to supply electrons to the conduction band of the diamond, which is the region functioning as an emitter. Furthermore, in order to readily emit electrons, it is also necessary to control the surface state of the emitter portion. In order words, in order to form an efficient electron emitting device using a diamond layer, important are 1) a method for supplying electrons to the emitter region; and 2) a method for controlling the surface of the emitter portion.

According to an embodiment of the present invention, an electron emitting device is formed using a diamond layer and constituted by a multi-layer structure including at least an electrode layer, an electron supply layer and a diamond layer. Thus, the following functions are provided.

Figure 1:
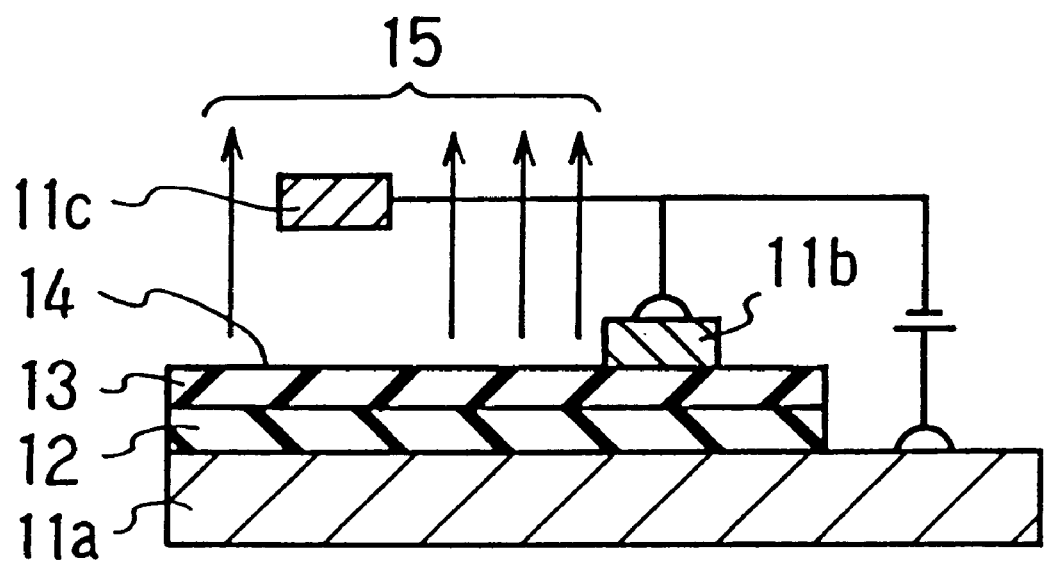
FIG. 1 is a view showing one embodiment of an electron emitting device having a multi-layer structure including an electrode layer, an electron supply layer and a diamond layer according to the present invention.

FIG. 1 is a schematic view of a device of this embodiment. A bias is applied across two different electrode layers 11a and 11b so that an electric field can be easily applied to an electron supply layer 12 and a diamond layer 13 interposed therebetween. At this time, by controlling the magnitude of application of the bias, a suitable electric field can be supplied to the electron supply layer 12. As a result, electrons can be readily injected from one electrode layer 11a to the electron supply layer 12, and further from the electron supply layer 12 to the diamond layer 13. In addition, by controlling the state of the surface 14 of the diamond layer, the state of a negative electron affinity can be generated. Thus, it is possible to efficiently extract electrons. The state of the surface 14 of the diamond layer having the negative electron affinity is easily realized, although not particularly limited, by bonding hydrogen atoms to carbon atoms on the uppermost surface of the diamond layer 13. Furthermore, as the electron supply layer, although not particularly limited, diamond having an insulation property and an insulating layer can be used.

In the case of such an embodiment, as long as the electric field is applied to the electron supply layer 12 and electrons are supplied to the diamond layer 13, the electrode 11b shown in FIG. 1 is not necessarily in contact with the diamond layer 13. The electrode can be spaced away in a space on the side of the diamond layer, as shown by the electrode 11c. In this embodiment, the following functions are provided. When electrons are injected from the electrode layer 11a to the electron supply layer 12 by a method such as tunneling, photoexcitation, thermal excitation or the like, electrons are supplied from the electron supply layer 12 to the conduction band of the diamond layer 13. The electrons which are supplied to the conduction band of the diamond having the negative electron affinity in this manner are easily extracted out from the surface 14 of the diamond layer. As a result, it is possible to obtain emitted electrons efficiently (shown by arrow 15) with a smaller amount of energy than in the prior art.

In the embodiment described above, at least the electron supply layer 12 and the diamond layer 13 are interposed between the two electrodes 11a and 11b. However, as long as the electric field is applied to the electron supply layer, and electrons are supplied to the diamond layer, a voltage can be applied only to the electron supply layer so as to realize the electron emitting device of the present invention. The two electrode layers in this case are arranged with only the electron supply layer interposed therebetween. The diamond layer is formed on the electron emission face, the same side as the electrode, in contact with the electron supply layer.

As for the diamond layer 13 used in these embodiments, a p-type diamond layer is suitable, because the Fermi level is on the vicinity of the valence band edge, so that the level of the conduction band edge is higher than the vacuum level, thus resulting in a remarkable negative electron affinity. The thickness and the electrical resistivity thereof are 5 μm or less and $1\times10^4$ Ω·cm or less, more preferably 1 μm or less and $1\times10^2$ Ω·cm or less, respectively. The reason is that in the case where the film thickness is as small as above, electrons supplied from the electron supply layer 12 to the conduction band of the diamond layer 13 easily reach the surface 14 of the diamond layer, and the electrons are extracted as emitted electrons 15. When the thickness is large, an emission efficiency is lowered because the electrons are transited to the valence band, or electrons are attracted to the electrodes before reaching the surface. Furthermore, in the case where the electrical resistivity is larger than the above-mentioned value, the Fermi level of the diamond approaches the center of the forbidden band, thus degrading the characteristic of the negative electron affinity. In addition, when the electrical resistivity is high, the ratio of the electric field applied to the electron supply layer is reduced, thus degrading the efficiency of supply of electrons.

A boron (B) atom concentration contained in the p-type diamond layer is in the range from $1\times10^{16}$ atoms/cm$^3$ to $1\times10^{20}$ atoms/cm$^3$, more preferably $1\times10^{17}$ atoms/cm$^3$ or more. Such a value can be easily realized by controlling the formation conditions of the p-type diamond layer. When the boron atom concentration is less than the above-mentioned value, the device efficiency is degraded, as in the case of a larger electrical resistivity of the diamond layer.

Furthermore, the electron emission surface of the diamond layer is excellent in the negative electron affinity when it is terminated with hydrogen. Thus, even if it is covered with Cs, Ni, Ti, W, H, a-C ("a" indicates amorphous) or the like, it can work as an electron emitting device. A suitable combined atom density is in the range from $1\times10^{15}$ atoms/cm$^2$ to $1\times10^{17}$ atoms/cm$^2$. The diamond surface terminated with hydrogen generally has conductivity, and this conductive surface layer is effective as an electron emission surface of diamond.

Furthermore, the range of the bias applied across the electrodes depends on the thickness and the electrical resistivity of the electron supply layer 12 and the diamond layer 13, but an operating electron emitting device can be realized in the range from 0.1 V to 100 V.

According to another embodiment of the present invention, the electron emitting device formed using a diamond layer includes at least an electrode layer, an electron supply layer, a diamond layer and an insulating layer laminated in contact with the diamond layer. Thus, the following functions are provided.

Figure 2:
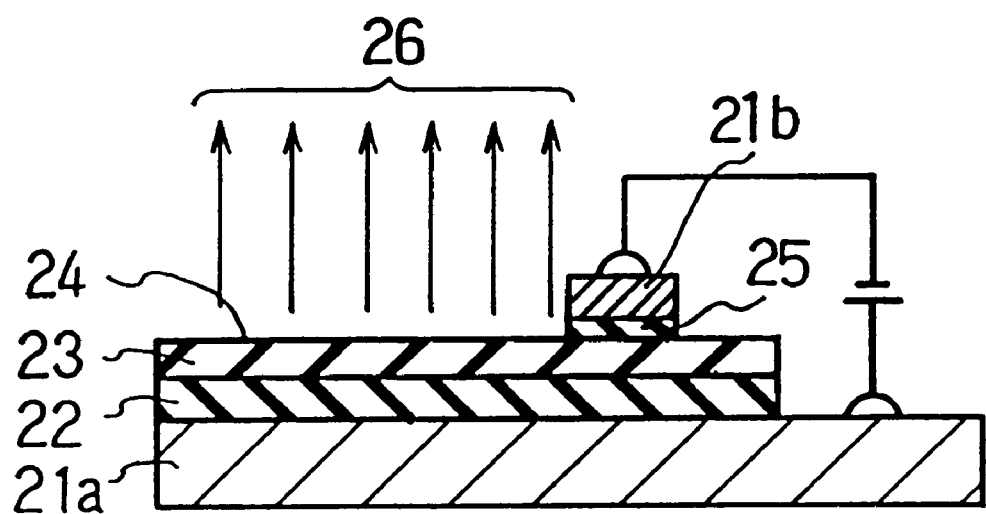
FIG. 2 is a view showing one embodiment of an electron emitting device having a multi-layer structure including an electrode layer, an electron supply layer, a diamond layer and an insulating layer according to the present invention.

FIG. 2 is a schematic view showing a device of this embodiment. A bias is applied across two different electrode layers 21a and 21b so that an electric field can be easily applied to an electron supply layer 22 and a diamond layer 23 interposed therebetween. At this time, by controlling the magnitude of application of the bias, a suitable electric field can be supplied to the electron supply layer 22. As a result, electrons can be easily injected from one electrode layer 21a to the electron supply layer 22, and further from the electron supply layer 22 to the diamond layer 23. In addition, part of the injected electrons which flow in the other electrode 21b without being extracted can be suppressed by the insulating layer 25. Thus, it is possible to extract electrons efficiently (shown by arrow 26) from the surface 24 of the diamond layer having the negative electron affinity.

The range of the bias applied across the two electrodes depends on the thickness and the electrical resistivity of the electron supply layer 22 and the diamond layer 23, as in the embodiment described above, but electrons can be supplied and emitted from the diamond layer surface in the range from 0.1 V to 100 V.

As for the diamond layer used in the present invention, a p-type diamond layer is suitable, as in the embodiment described above. The desired characteristics are the same as above.

As for the insulating layer 25, a layer having a sufficient thickness and electrical resistivity to prevent current from flowing in the electrode layer 21b without affecting an electric field amount applied to the electrode supply layer 22 is suitable. More specifically, the thickness is preferably 1 μm or less, and the electrical resistivity is in the range from $1\times10^4$ Ω·cm to $1\times10^{12}$ Ω·cm, more preferably $1\times10^8$ Ω·cm or more. When the thickness becomes large, the ratio of the electric field applied to the insulating layer 25 to the electric field applied across the electrodes 21a and 21b increases, so that an efficiency of supply of electrons from the electron supply layer is reduced. The material or the like for the insulating layer 25 is not particularly limited, but an insulating diamond layer or a silicon dioxide layer is commonly used.

The preferred example where the diamond layer includes at least a p-type diamond layer is suitable for an electron emitting device for the above-described reasons. Furthermore, in this embodiment of the present invention, according to the preferred example where the thickness and the resistivity of the p-type diamond layer included in the diamond layer are in the range from 0.05 μm to 5 μm and the range from $1\times10^{-2}$ Ω·cm to $1\times10^4$ Ω·cm, more preferably 1 μm or less and $1\times10^2$ Ω·cm or less, respectively, it is possible to emit electrons under lower bias.

Furthermore, according to an embodiment of the present invention, an electron emitting device formed using a diamond layer is constituted by an MIS structure including an electrode layer, an electron supply layer including an insulator such as an i-type diamond layer or the like, and a p-type diamond layer. A forward bias is applied to the MIS structure so as to supply electrons to the p-type diamond layer via the electron supply layer. Thus, the following functions are provided. By applying a suitable forward bias to the MIS structure, electrons from the electrode layer such as a metal tunnel a Schottky barrier existing at the interface between the metal and the insulating layer and are efficiently injected to the p-type diamond layer. In addition, the injected electrons are easily emitted from the p-type diamond layer surface or the like having the state of the negative electron affinity.

Figure 3:
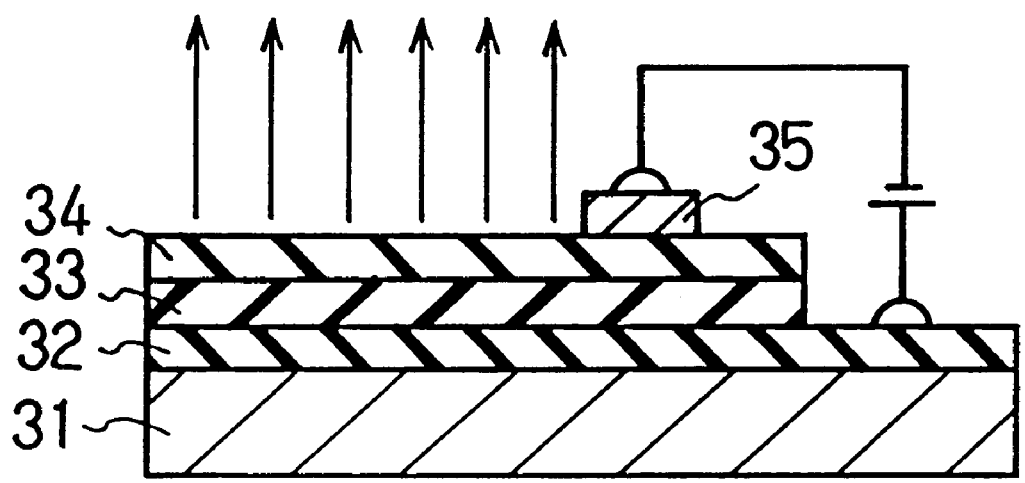
FIG. 3 is a view showing one embodiment of an MIS type electron emitting device using a diamond layer according to the present invention.

FIG. 3 is a view showing an embodiment of an electron emitting device according to the present invention. In this embodiment, an i-type diamond layer is used as an electron supply layer (insulating layer) 33, and a Schottky barrier is formed at the interface between the electron supply layer 33 and the electrode layer 32. A p-type diamond layer 34 having the negative electron affinity as a result of control of the surface is formed on the i-type diamond layer. An electrode layer 35 is formed on a part of the surface of the p-type diamond layer 34 for applying a bias to the device.

Figure 4A:
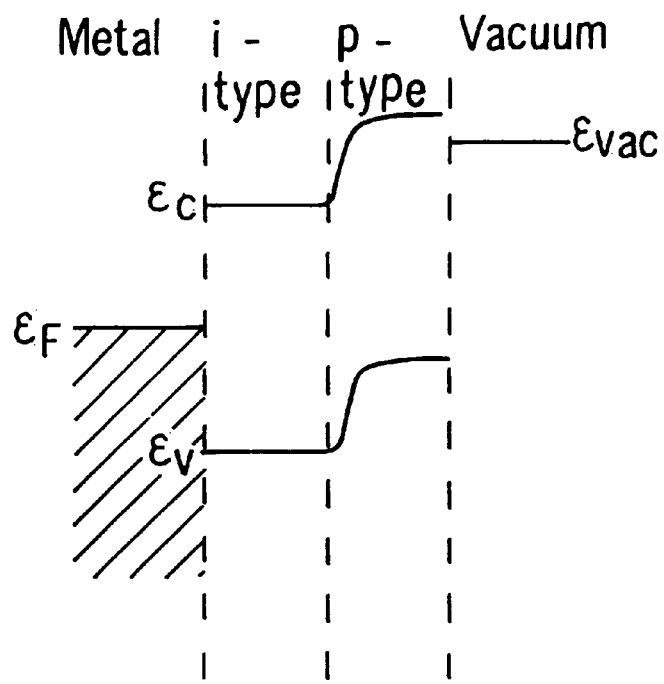
FIGS. 4A and 4B are schematic views showing energy bands of an MIS type electron emitting device using a diamond layer according to the present invention.

FIG. 4 is a schematic view showing the energy band of this embodiment. "Metal" shown in FIG. 4 denotes the metal electrode layer 32, and "i-type" and "p-type" denote the electron supply layer (insulating layer: i-type diamond layer) 33 and the p-type diamond layer 34, respectively. "$\epsilon_C$", "$\epsilon_V$", "$\epsilon_F$" and "$\epsilon_{Vac}$" denote the conduction band edge, the valence band edge, the Fermi level, and the energy level of the vacuum level, respectively.

Figure 4B:
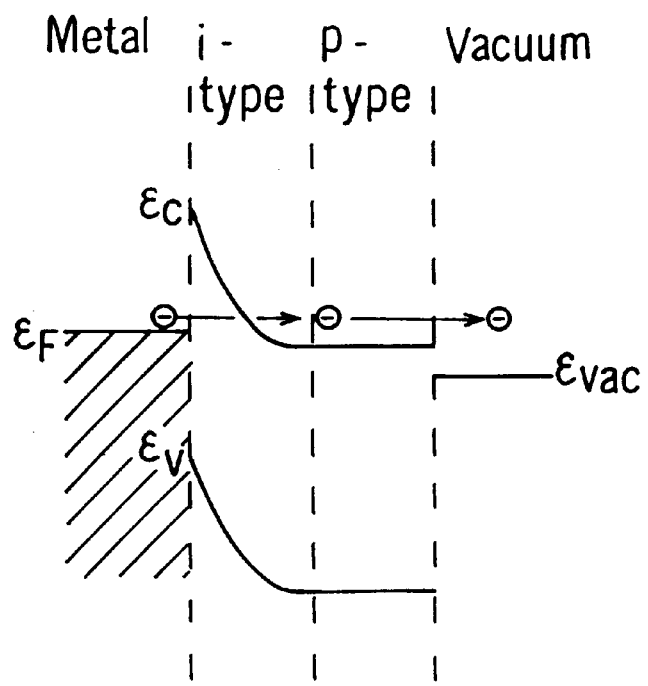

In the equilibrium condition (applied bias: 0, FIG. 4A), the surface of the p-type diamond layer 34 is in the state of the negative electron affinity. However, since electrons which are minority carriers hardly exist in the conduction band, electrons cannot be emitted. On the other hand, in the state where a suitable forward bias is applied (FIG. 4B), since most of the bias is applied to the electron supply layer (insulating layer) 33, the band bends as shown in FIG. 4B. As a result, the Schottky barrier existing in the interface between the metal and the insulating layer becomes thin. Then, electrons from the electrode layer 32 are injected to the conduction band of the p-type diamond layer 34 by tunneling. The degree of the injection depends on the energy height ($\Delta\epsilon=\epsilon_C-\epsilon_F$) of the Schottky barrier at the interface between the electrode layer and the insulating layer, or the barrier width, but it is possible to inject electrons efficiently by choosing a suitable thickness of the electron supply layer (insulating layer) 33. The electrons injected to the p-type diamond layer 34 move by diffusion or the like to an emitter portion where the electrons are emitted. Then, since the surface of the p-type diamond layer 34 has the negative electron affinity ($\epsilon_V>\epsilon_{Vac}$), the electrons are emitted to vacuum. In this manner, by applying a forward bias to the MIS structure of the electrode layer 32, the electron supply layer (insulating layer: i-type diamond layer) 33, and the p-type diamond layer 34, the emitted electrons are stably and efficiently obtained. In the description above, the i-type diamond layer is used as the electron supply layer (insulating layer) 33, but this is not limited thereto, and a silicon dioxide layer or the like can be used. A material used for the electrode layer 32 is not particularly limited, but aluminum (Al) or tungsten (W) are generally used.

In the present invention, according to a preferred example where the thickness of the p-type diamond layer is 5 μm or less, preferably 1 μm or less, it is possible to supply injected electrons efficiently to the surface having the state of the negative electron affinity. In the present invention, according to a preferred example where a boron atom concentration contained in the p-type diamond layer is in the range from $1\times10^{16}$ atoms/cm$^3$ to $1\times10^{20}$ atoms/cm$^3$, more preferably $1\times10^{17}$ atoms/cm$^3$ or more, the p-type diamond layer suitable for the device structure can be obtained. In the present invention, according to a preferred example where a resistivity of the p-type diamond layer is in the range from $1\times10^{-2}\Omega\cdot$cm to $1\times10^4\Omega\cdot$cm, more preferably $1\times10^2\Omega\cdot$cm or less, it is possible to suppress a loss due to the resistance.

In the present invention, according to a preferred example where an electrical resistivity of the i-type diamond layer used as the electron supply layer (insulating layer) is in the range from $1\times10^4\Omega\cdot$cm to $1\times10^{12}\Omega\cdot$cm, more preferably $1\times10^8\Omega\cdot$cm or more, an applied bias can be efficiently applied to a region having a high resistance. Therefore, electrons can be easily injected by tunneling.

Furthermore, according to the present invention, an electron emitting device formed using a diamond layer is characterized by applying a forward bias to a pn structure including an electrode layer, an electron supply layer formed of an n-type semiconductor layer such as an n-type diamond layer or the like, and a p-type diamond layer. Thus, electrons are efficiently injected to the p-type diamond layer from the n-type semiconductor layer. In addition, the injected electrons can easily be emitted from the p-type diamond layer surface or the lie having the state of the negative electron affinity.

Figure 5:
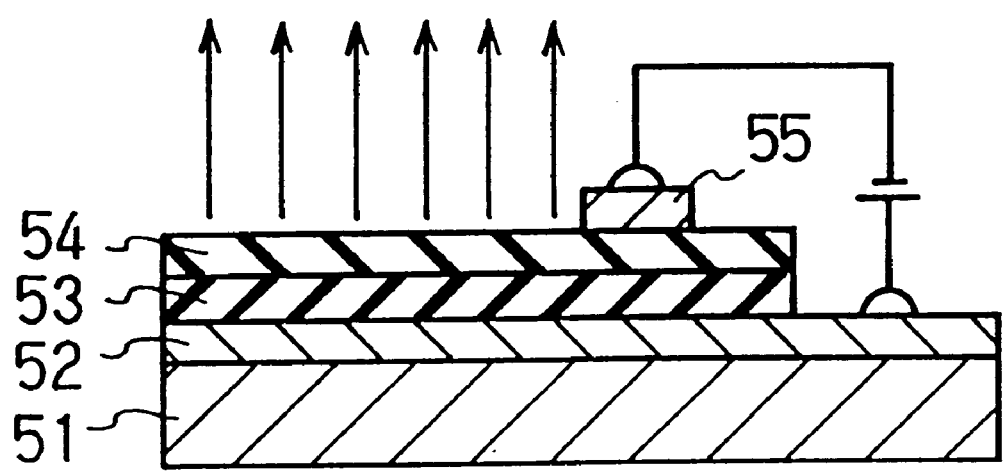
FIG. 5 is a view showing one embodiment of a pn junction type election emitting device using a diamond layer according to the present invention.

FIG. 5 is a view showing a preferred example of an electron emitting device according to the present invention. In this example, an n-type diamond layer is formed on an electrode layer 52 as an electron supply layer 53 formed of an n-type semiconductor layer. Furthermore, a p-type diamond layer 54 having the state of the negative electron affinity resulting from the control of the surface state is formed on the n-type diamond layer 53. Then, an electrode layer 55 for applying a bias to the device is formed on a part of the surface of the p-type diamond layer 54.

Figure 6A:
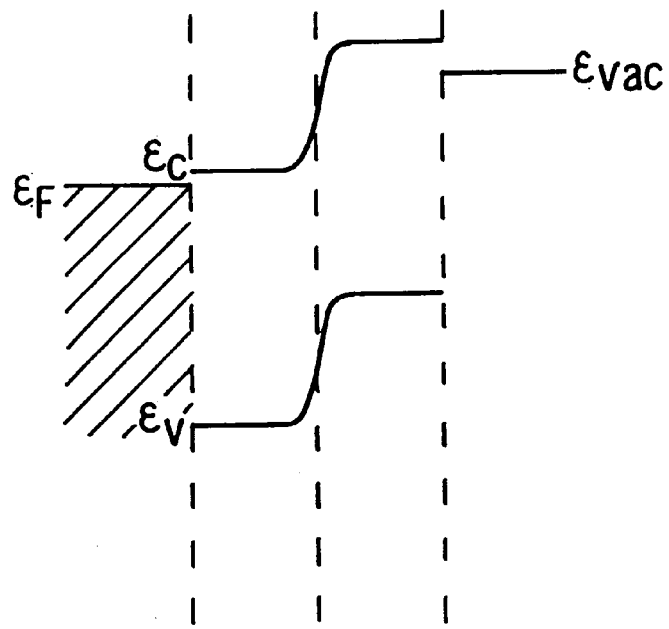
FIGS. 6A and 6B are schematic views showing energy bands of a pn junction type electron emitting device using a diamond layer according to the present invention.
Figure 6B:
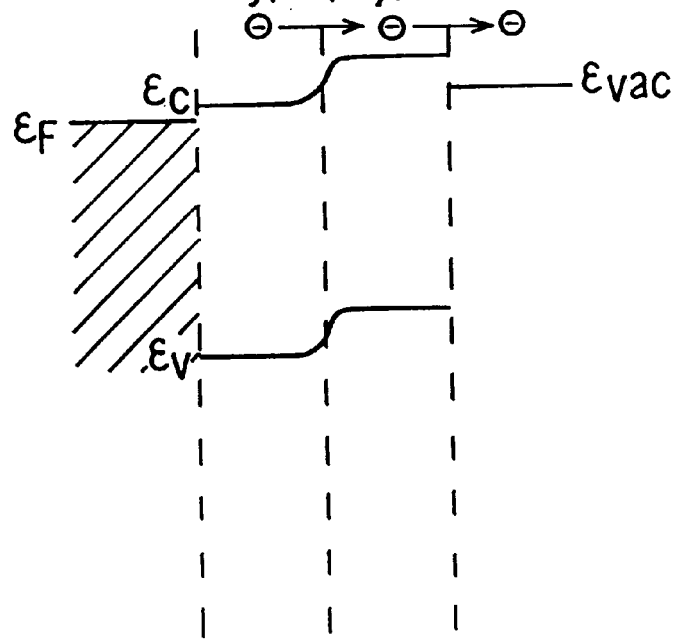

FIGS. 6A and 6B are schematic views showing the energy band of the structure described above. "Metal" shown in FIGS. 6A and 6B denotes the metal electrode layer 52, and "n-type" and "p-type" denote the electron supply layer (n-type semiconductor layer: n-type diamond layer) 53 and the p-type diamond layer 54, respectively. In equilibrium condition (applied bias: 0, FIG. 6A), the p-type diamond layer 54 is in the state of the negative electron affinity. However, since electrons hardly exist in the conduction band, electrons cannot be emitted. On the other hand, in the state where a suitable forward bias is applied (FIG. 6B), electrons are injected from the n-type semiconductor layer 53 (n-type diamond layer) to the conduction band of the p-type diamond layer 54. The injected electrons move by diffusion or the like to an emitter portion where the electrons are emitted from the p-type diamond layer 54. In this manner, by applying a forward bias to the pn structure of the electrode layer 52 having a suitable thickness, the n-type semiconductor layer 53 (n-type diamond layer), and the p-type diamond layer 54, the emitted electrons are obtained stably and efficiently.

In the description above, the n-type diamond layer is used as the n-type diamond layer 53, but this is not limited thereto, and a n-type silicon carbide or the like can be used. A material used for the electrode layers 52 and 55 is not particularly limited, but titanium (Ti) or gold/titanium (Au/Ti) or the like are generally used.

In the present invention, according to a preferred example where the thickness of the p-type diamond layer is in the range from about 0.05 μm to 5 μm, more preferably 1 μm or less, the injected electrons can be supplied efficiently to the surface having the state of the negative electron affinity.

In the present invention, according to a preferred example where a boron atom concentration contained in the p-type diamond layer is in the range from $1\times10^{16}$ atoms/cm$^3$ to $1\times10^{20}$ atoms/cm$^3$, more preferably $1\times 10^{17}$ atoms/cm$^3$ or more, the p-type diamond layer suitable for the device structure can be obtained.

In the present invention, according to a preferred example where the resistivity of the p-type diamond layer is in the range from $1\times10^{-2}\Omega\cdot$cm to $1\times10^4\Omega\cdot$cm, more preferably $1\times10^2\Omega\cdot$cm or less, it is possible to suppress a loss due to the resistance.

In the present invention, according to a preferred example where a phosphorus (P) atom or nitrogen (N) concentration contained in the n-type diamond layer is in the range from $1\times10^{16}$ atoms/cm$^3$ to $1\times10^{20}$ atoms/cm$^3$, more preferably $1\times10^{17}$ atoms/cm$^3$ or more, the n-type diamond layer suitable for the device structure can be obtained.

In the present invention, according to a preferred example where the resistivity of the n-type diamond layer and the n-type semiconductor layer is in the range from $1\times10^{-2}\Omega\cdot$cm to $1\times10^4\Omega\cdot$cm, more preferably $1\times10^2$ $\Omega\cdot$cm or less, it is possible to suppress a loss due to the resistance.

According to the present invention, an electron emitting device formed using a diamond layer is characterized by applying a forward bias to a pin structure including an electrode layer, an electron supply layer including an n-type semiconductor layer and an i-type semiconductor layer, and a p-type diamond layer. Thus, as in the case described above, electrons are efficiently injected from the n-type semiconductor layer to the p-type diamond layer via tunneling of the i-type semiconductor. In addition, the injected electrons are easily emitted from the p-type diamond layer surface or the like having the state of the negative electron affinity. In this manner, by applying a forward bias to the pin structure including the electrode layer having a suitable thickness, the n-type semiconductor layer, the i-type semiconductor layer and the p-type diamond layer, the emitted electrons are stably and efficiently obtained.

In the present invention, according to a preferred example where the p-type diamond layer has a thickness of 0.05 $\mu$m to 5 $\mu$m, more preferably, 1 $\mu$m or less, it is possible to efficiently supply the injected electrons to the surface having the state of the negative electron affinity. Furthermore, in the present invention, according to a preferred example where a boron atom concentration contained in the p-type diamond layer is in the range from $1\times10^{16}$ atoms/cm$^3$ to $1\times10^{20}$ atoms/cm$^3$, more preferably $1\times10^{17}$ atoms/cm$^3$ or more, the p-type diamond layer suitable for the device structure can be obtained. In the present invention, according to a preferred example where the electrical resistivities of the p-type diamond layer and the n-type semiconductor are in the range from $1\times10^{-2}\Omega\cdot$cm to $1\times10^{4}\Omega\cdot$cm, more preferably $1\times10^{2}\Omega\cdot$cm or less, it is possible to suppress a loss due to the resistance.

In the present invention, according to a preferred example where an electrical resistivity of the i-type semiconductor layer is in the range from $1\times10^{4}\Omega\cdot$cm to $1\times10^{12}\Omega\cdot$cm, more preferably $1\times10^{8}\Omega\cdot$cm or more, an applied bias can be applied efficiently to a region having a high resistance. Therefore, electrons can be injected easily by tunneling.

Furthermore, in the present invention, according to a preferred example where the emitter portion from which electrons are emitted is on the surface of the p-type diamond layer, the state of the negative electron affinity can be easily obtained by controlling of the surface state. In addition, the injected electrons can be easily emitted out, so that an efficient electron emitting device can be realized.

Furthermore, in the present invention, according to a preferred example where carbon atoms on the uppermost surface of the p-type diamond layer are terminated with bonds to hydrogen atoms, a structure where carbon atoms on the uppermost surface are bonded to hydrogen atoms can be formed in a simple method. In addition, the p-type diamond can be made in a significantly stable state of the negative electron affinity.

Furthermore, in the present invention, according to a preferred example where the amount of hydrogen atoms bonded to carbon atoms on the uppermost surface of the p-type diamond layer is $1\times10^{15}$ atoms/cm$^2$ to $1\times10^{17}$ atoms/cm$^2$, preferably $2\times10^{15}$ atoms/cm$^2$ or more, almost all carbon atoms on the uppermost surface are bonded to hydrogen atoms, so that a more stable state of the negative electron affinity can be maintained.

Furthermore, in the present invention, according to a preferred example where the emitter portion from which electrons are emitted is on the vicinity of the interface between the p-type diamond layer and the layer in contact with the p-type diamond layer, the distance of the diffusion of the electrons injected to the conduction band of the p-type layer is shortened, so that a more efficient electron emitting device can be realized.

Furthermore, in the present invention, according to a preferred example where a surface conductive layer of diamond is used as the p-type diamond layer, a layer for functioning as the p-type diamond layer having a thickness of 1 $\mu$m or less can be obtained easily without performing another process for forming a p-type diamond layer. Thus, an efficient electron emitting device can be easily realized.

Furthermore, in the present invention, according to a preferred example where the structure of the surface conductive layer of the diamond is such that carbon atoms on the uppermost surface of the diamond layer are terminated with bonds to hydrogen atoms, the p-type diamond can be made in a significantly stable state of the negative electron affinity in a simple method.

Furthermore, in the present invention, according to a preferred example where the amount of hydrogen atoms bonded to carbon atoms on the uppermost surface of the diamond layer is $1\times10^{15}$ atoms/cm$^2$ to $1\times10^{17}$ atoms/cm$^2$, preferably $2\times10^{15}$ atoms/cm$^2$ or more, almost all carbon atoms on the uppermost surface are bonded to hydrogen atoms, so that a more stable state of the negative electron affinity can be maintained.

Furthermore, in the present invention, according to a preferred example where the thickness of the entire diamond layer is 0.05 $\mu$m to 5 $\mu$m, more preferably 1 $\mu$m or less, electrons can be emitted efficiently without being lost in the diamond layer.

Furthermore, in the present invention, according to a preferred example where the structure of an electron emitting device formed using a diamond layer is shaped into a narrow line having a width of 0.05 $\mu$m to 5 $\mu$m, more preferably 1 $\mu$m or less, electrons can be emitted efficiently without being lost in the device. In addition, electrons can be emitted linearly.

Furthermore, in the present invention, according to a preferred example where the diamond layer is formed by a chemical vapor deposition method, a surface conductive layer can be obtained on the as-grown diamond layer surface without performing any treatment as a postprocess.

Furthermore, according to a method of the present invention as a method for forming the above-mentioned structure, the method for producing an electron emitting device using a diamond layer is characterized by including the step of forming diamond thin films, each having a thickness of 1 $\mu$m or less, on a substrate material by the chemical vapor deposition method. Thus, it is possible to easily form a highly efficient electron emitting device having a thin diamond layer.

Furthermore, according to the method of the present invention, the method for producing an electron emitting device using a diamond layer is characterized by including the steps of forming the diamond layer on a substrate material by the chemical vapor deposition method and of etching the diamond layer from the face of the diamond layer on the side of the substrate material or the surface of the diamond layer to a predetermined thickness or less. Thus, it is possible to easily form a highly efficient electron emitting device having a desired structure.

Furthermore, in the electron emitting device of the present invention, as described above, the control of the structure of the emitter portion surface is very important. A method for forming a structure suitable for the emitter portion is not particularly limited, but it is easy to control an element which controls the conductivity of the diamond surface, i.e., which bonds to carbon atoms on the diamond surface. As a specific example, by generating a hydrogen-terminated surface (conductivity), the diamond can assume the state of the negative electron affinity. On the other hand, by generating an oxygen-terminated surface (insulation), the diamond can assume the state of the positive electron affinity. Such a change in the surface state is arbitrarily controlled, so that the device structure of the highly efficient electron emitting device and its production process can be simple.

According to the method of the present invention, the method for producing an electron emitting device formed using a diamond layer is characterized by including the step of irradiating a predetermined region of the diamond layer with ultraviolet rays of a wavelength of 200 nm or less. Thus, it is possible to selectively remove elements bonded to the diamond surface and to form new bonds. As a result, it is possible to control the state of the electron affinity on the diamond surface either to be positive (insulating) or negative (conductive).

According to the method of the present invention, the method for producing an electron emitting device formed using a diamond layer is characterized by including the step of exposing a predetermined region of the diamond layer to a plasma obtained from a gas including at least a hydrogen gas. Thus, it is possible to selectively bond carbon atoms on the uppermost surface of the diamond layer to hydrogen atoms. As a result, it is possible to easily form a region having the negative electron affinity.

According to the method of the present invention, the method for producing an electron emitting device formed using a diamond layer is characterized by including the step of exposing the heated diamond layer to a gas including at least a hydrogen gas. Thus, it is possible to selectively bond carbon atoms on the uppermost surface of the diamond layer to hydrogen atoms. As a result, it is possible to easily form a region having the negative electron affinity.

According to the method of the present invention, the method for producing an electron emitting device formed using a diamond layer is characterized by including the step of exposing a predetermined region of the diamond layer to a plasma obtained from a gas including at least an oxygen gas. Thus, it is possible to selectively bond carbon atoms on the uppermost surface of the diamond layer to oxygen atoms. As a result, it is possible to easily form a region having the positive electron affinity.

According to the method of the present invention, the method for producing an electron emitting device formed using a diamond layer is characterized by including the step of exposing the heated diamond layer to a gas including at least an oxygen gas. Thus, it is possible to selectively bond carbon atoms on the uppermost surface of the diamond layer to oxygen atoms. As a result, it is possible to easily form a region having the positive electron affinity.

As described above, by arbitrarily controlling the surface state of the diamond layer, the device structure of a highly efficient electron emitting device and its production process can be simple.

Furthermore, the electron emitting device including a diamond layer as described above is formed, so that a planar electron emitting device which emits electrons from the p-type diamond surface in a planar shape can be realized. Although in a conventional conical emitter the electron emission is effected only at the protruded point, it is confirmed that the electron emitting device of the present invention including the diamond layer emits electrons in a plane of an area of 1 $\mu m^2$ to 10000 $\mu m^2$.

Hereinafter, the present invention will be more specifically described by way of examples.

EXAMPLE 1

First, an insulating diamond layer for an electron supply layer and a p-type diamond layer were formed on a 2×2×0.5 mm silicon (Si) substrate by the chemical vapor deposition method. The chemical vapor deposition method for the diamond layer is not particularly limited, but a gas obtained by diluting a carbon source such as a hydrocarbon gas (methane, ethane, ethylene, acetylene or the like), an organic compound (alcohol, acetone or the like), and carbon monoxide or the like with a hydrogen gas is generally used as a source gas. Then, energy is supplied to the source gas so as to effect decomposition. In this case, oxygen, water or the like can be further added to the source gas, if necessary. In this example, the insulating diamond layer and the p-type diamond layer were formed by a microwave plasma CVD method, which is one of the chemical vapor deposition methods. The microwave plasma CVD method is a method for forming a diamond by applying microwaves to the source gas to generate plasma. The specific conditions were as follows. A carbon monoxide gas diluted with hydrogen to about 1 to 10 vol % was used as the source gas. A diborane gas was added to the source gas for letting the diamond assume the p-type. The reaction temperature and pressure were 800 to 900° C. and 25 to 40 Torr; respectively. Thicknesses of the formed insulating diamond layer and the p-type diamond layer were 2 $\mu$m and 0.5 $\mu$m, respectively. Furthermore, it was confirmed that $1 \times 10^{18}$ boron atoms per $cm^3$ were contained in the p-type film by secondary ion mass spectrometry, and the electrical resistivity thereof was $1 \times 10^2 \Omega \cdot cm$ or less. Hydrogen atoms were bonded to the uppermost surface of the obtained p-type diamond layer. The results of evaluation of the electron affinity on the p-type diamond surface using ultraviolet ray irradiation indicated the negative electron affinity.

Then, a hole was formed by removing a part of the Si substrate with a nitric acid solution, and an electrode of aluminum (Al) was formed on the face in contact with the substrate, i.e., the insulating diamond layer, by vacuum evaporation. Furthermore, an electrode of gold/titanium (Au/Ti) was formed on the p-type diamond layer by electron-beam evaporation. As a result, the structure as shown in FIG. 1, where the insulating diamond layer (electron supply layer) and the p-type diamond layer are interposed between the two electrodes, was produced.

The electron emitting device produced in the manner described above was placed in a vacuum of about $10^{-9}$ Torr, and a positive voltage up to about 100 V was applied to the Al electrode. As a result, it was confirmed that electrons were being emitted from the p-type diamond surface. The ratio of the emitted current (emission efficiency) was about 0.1 to 10%. It was confirmed that electrons were emitted more efficiently than in the prior art.

In the case where the p-type diamond layer was formed under other conditions, in the case where another material for the substrate was used, and in the case where Al was replaced by tungsten (W) as a material for the electrode, the same results were obtained.

EXAMPLE 2

A diamond layer was formed on a 2×2×0.5 mm Si substrate by microwave plasma CVD method in the same manner as in Example 1. In this example, only an insulating diamond layer was formed. The specific conditions were the same as in Example 1. A surface conductive layer generally exists in the diamond layer formed by the microwave plasma CVD method, as a result of the bonding of hydrogen atoms to the surface thereof.

It is known that the surface conductive layer works as p-type. Therefore, the insulating diamond layer having the surface conductive layer has the same structure as the structure where the p-type diamond layer is formed on the insulating diamond layer (electron supply layer) as in Example 1. As a result of the evaluation of the surface of the insulating diamond layer having the surface conductive layer, hydrogen atoms were bonded to the uppermost surface, and the electron affinity was negative. Then, a hole was formed by etching a part of the Si substrate with a nitric acid solution so as to form an Al electrode on the face in contact with the substrate, and an Au/Ti electrode was formed on a part of the surface conductive layer. As a result, the structure where the diamond layer was interposed between the two electrode layers as shown in FIG. 1 was produced.

The electron emitting device produced in the manner described above was placed in a vacuum of about $1^{-9}$ Torr, and a positive voltage up to about 100 V was applied to the Al electrode. As a result, it was confirmed that electrons were being emitted from the surface conductive layer of the diamond. The ratio of the emitted current (emission efficiency) was about 0.1 to 10%. It was confirmed that electrons were emitted more efficiently than in the prior art.

In the case where the insulating diamond layer was formed under other conditions, in the case where another material for the substrate was used, and in the case where Al was replaced by W as a material for the electrode, the same results were obtained.

EXAMPLE 3

An insulating diamond layer having a surface conductive layer was formed on a Si substrate by microwave plasma CVD method and an Al electrode was formed on the face in contact with the substrate in the same manner as in Example 2. Thereafter, a silicon dioxide layer ($SiO_2$) with a thickness of 0.1 $\mu$m having an insulating property was formed on a part of the surface of the insulating diamond layer (the surface conductive layer). The $SiO_2$ film was formed by rf sputtering method with a quartz disk as the target. Furthermore, an Al electrode was formed on the $SiO_2$ layer. As a result, the structure where the electron supply layer, the diamond layer and the insulating layer were interposed between the two electrodes as shown in FIG. 2 was produced.

The electron emitting device produced in the manner described above was placed in a vacuum of about $10^{-9}$ Torr, and a positive voltage up to about 100 V was applied to the Al electrode on the side of the substrate. As a result, it was confirmed that electrons were being emitted from the surface conductive layer of the diamond, and current did not substantially flow in the Al electrode on the side of the surface.

In the case where the insulating diamond layer was formed under other conditions, in the case where another material for the substrate was used, and in the case where another type for the electrode material was used, the same results were obtained.

EXAMPLE 4

Figure 7:
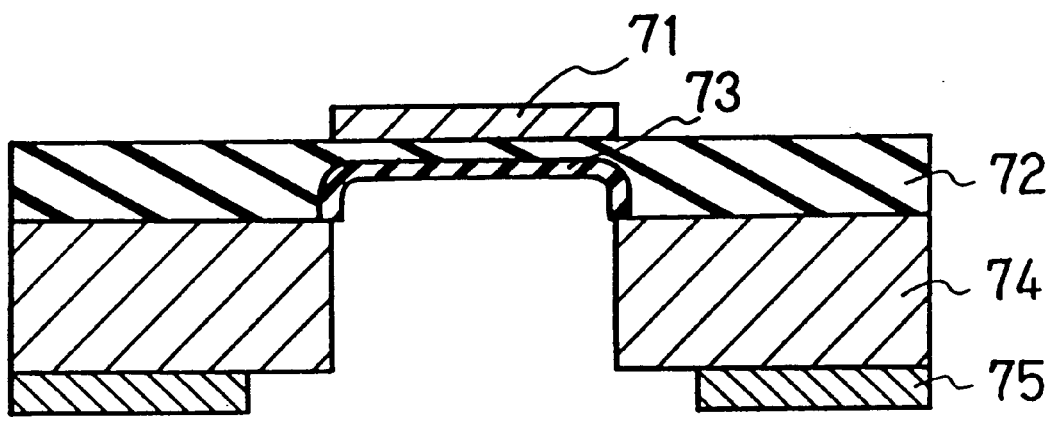
FIG. 7 is a cross-sectional view showing an example of an MIS type electron emitting device using a diamond layer according to the present invention.

FIG. 7 is a view showing the basic structure of an example of an MIS structure type electron emitting device using a diamond layer. As shown in FIG. 7, the electron emitting device includes an electrode layer (Schottky electrode) 71, an insulating layer 72 formed of i-type diamond as an electron supply layer, a p-type diamond layer 73, a substrate (conductive) 74 and an electrode layer 75 for applying an electric field to the device, as major components. By applying a forward bias across the electrode layers 71 and 75, electrons injected from the electrode layer 71 reach the substrate 74 and the electrode layer 75 via the electron supply layer (insulating layer) 72 and the p-type diamond layer 73, and form an MIS structure diode current. A current flowing at the vicinity of the surface of the p-type diamond layer 73 among the current flow is emitted by diffusion or the like. In this structure, since electrons are emitted in a plane shape, a current density in a plane can be increased.

FIGS. 8A to 8F schematically show a process used for producing an example of the MIS structure type electron emitting device as shown in FIG. 7.

Figure 8A:
FIGS. 8A to 8F are views showing processes for forming an example of an MIS type electron emitting device using a diamond layer according to the present invention.

First, the substrate 74 was prepared, as shown in FIG. 8A. The material for the substrate is not particularly limited, as long as it is conductive. However, in view of the postprocess, a metal such as Si or molybdenum (Mo) is generally used. In this example, a Si substrate having a low resistivity was used.

Figure 8B:
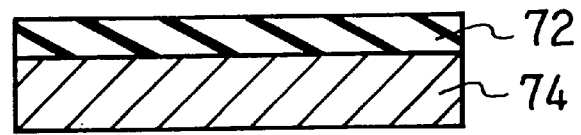

Next, as shown in FIG. 8B, an insulating film was formed on the substrate 74 as the electrode supply layer 72. The material for the electron supply layer (insulating layer) 72 is not particularly limited, but an i-type insulating diamond not containing impurities formed by the chemical vapor deposition is most suitable. In this example, the i-type diamond layer was formed by the microwave plasma CVD method.

Figure 8C:
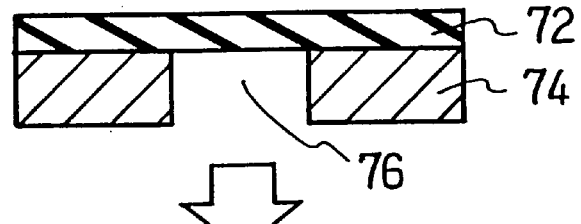

Then, a portion of the lower face of the substrate 74 was removed by etching, as shown in FIG. 8C. A method for etching is not particularly limited, but suitably selected, depending on the material for the substrate 74 or the like. For example, in the case where the substrate 74 is formed of Si, a wet etching technique using $HF+HNO_3$ solution can be used.

Figure 8D:
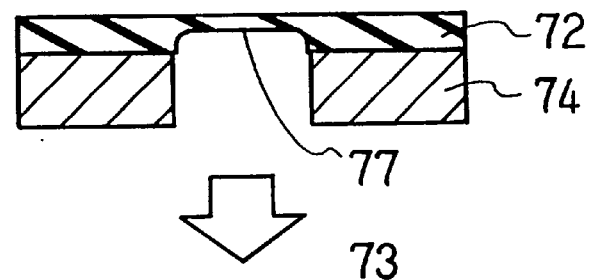

Furthermore, as shown in an etched face 77 in FIG. 8D, the electron supply layer (insulating layer: i-type diamond layer) 72 was etched from the lower face thereof so that the thickness of the i-type diamond layer was thinner than 5 $\mu$m. The etching of the diamond layer was carried out by ECR ion etching or reactive ion etching (RIE) using an oxygen gas. Conditions for the ECR ion etching were as follows: gas pressure, 0.01 Torr; bias voltage, −30 V; bias current, 2 mA/cm$^2$; microwave power, 650 W; substrate temperature, 280° C.

Figure 8E:

Thereafter, as shown in FIG. 8E, the p-type diamond layer 73 was formed on the etched face 77 of the electron supply layer (insulating layer) 72. The p-type diamond layer may be newly formed by the CVD method using a source gas to which p-type impurities such as boron are added. Alternatively, as described in Example 2, in the case where the i-type diamond is used as the insulating layer, the surface conductive layer obtained by irradiating the etched face with hydrogen plasma or the like to terminate the surface thereof with hydrogen may be used as the p-type diamond layer.

Figure 8F:
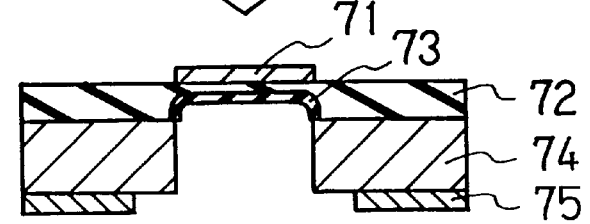

Finally, as shown in FIG. 8F, the electrode layers 71 and 75 were formed on the electrode supply layer (insulating layer) 72 and the substrate 74, respectively. In general, materials thereof can be suitably selected from aluminum (Al), tungsten (W), gold/titanium (Au/Ti) or the like.

As a result of the evaluation of the current—voltage characteristics by applying a voltage to the thus produced electron emitting device, it was confirmed that rectification was obtained, and the device operated as an MIS diode. Furthermore, the electron emitting device was placed in a vacuum of about $10^{-9}$ Torr, and a forward bias was applied. Then, electron emission characteristics were measured. As a result, the ratio of the emitted current to the diode current flowing in the device (emission efficiency) was about 0.1 to 10%. Thus, it was confirmed that electrons were emitted more efficiently than in the prior art.

In this example, the electron supply layer (insulating layer: i-type diamond layer) 72 was etched from the lower face so as to be thinner. On the other hand, in the case where the same structure was formed by etching the electron supply layer from the upper face so as to be thinner, and then hydrogenating the etched face so as to form the surface conductive layer, it was confirmed that electrons were emitted more efficiently than in the prior art.

Furthermore, in the case where a device was produced by previously raising a nucleus formation density of a CVD diamond film, forming sequential films each having a thin thickness (film thickness: 0.5 μm or less), and forming an electrode without etching, it was confirmed that electrons were emitted more efficiently than in the prior art.

Furthermore, in the case where the diamond was formed under other formation conditions, or a material for the substrate was changed, or in the case where a type of electrode material was changed, the same results were obtained.

EXAMPLE 5

Figure 9:
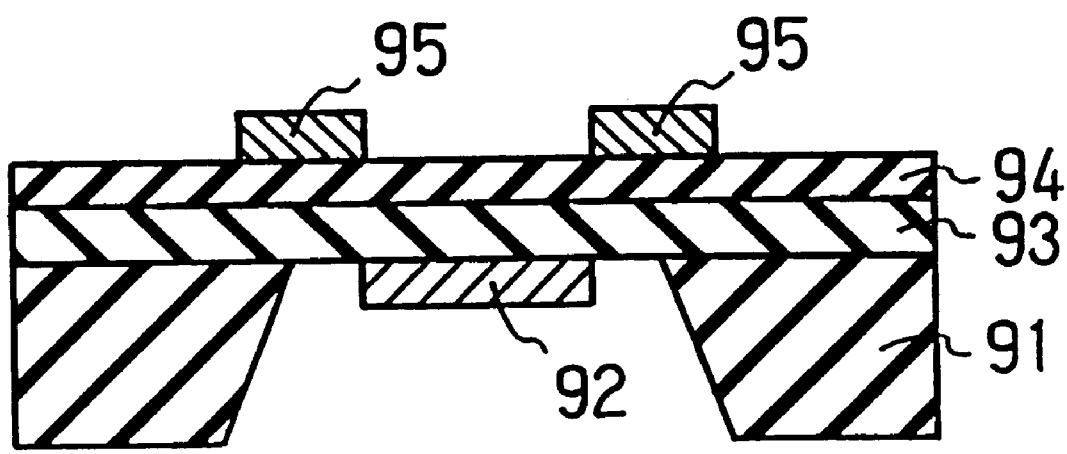
FIG. 9 is a cross-sectional view showing an example of a pn junction type electron emitting device using a diamond layer according to the present invention.

FIG. 9 is the basic structure of an example of a pn function type electron emitting device using a diamond layer. As shown in FIG. 9, the electron emitting device includes a substrate 91, an electrode layer 92, an n-type semiconductor layer 93 formed of n-type diamond as an electron supply layer, a p-type diamond layer 94, and an electrode layer 95, as major components. By applying a forward bias across the electrode layers 92 and 95, electrons are injected from the electron supply layer (n-type semiconductor layer) 93 to the p-type diamond layer 94, and form a pn junction diode current. A part of the electrons which reach the surface of the p-type diamond layer among the current flow are emitted due to the state of the negative electron affinity. In this structure, since the electrons are emitted in a plane shape, a current density in a plane can be increased.

FIGS. 10A to 10F schematically show a process used for producing an example of the pn junction type electron emitting device as shown in FIG. 9. First, the substrate 91 was prepared. The material for the substrate is not particularly limited. However, in view of the postprocess, Si is generally used. In this example, a Si substrate having a high resistance was used.

Figure 10A:
FIGS. 10A to 10F are views showing processes for forming an example of a pn junction type electron emitting device using a diamond layer according to the present invention.
Figure 10B:
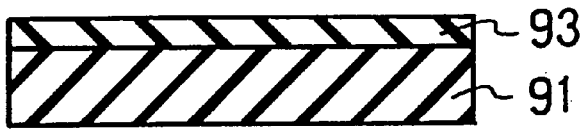

Then, as shown in FIG. 10B, the n-type semiconductor film was formed on the substrate 91 as the electron supply layer 93. The material for the n-type semiconductor layer is not particularly limited, but an n-type diamond or n-type silicon carbide which has been doped with phosphorus (P) or nitrogen (N) is generally used. Especially, an n-type diamond formed by the CVD method is most suitable because the p-type diamond layer 94 can be easily formed by the same technique. Therefore, in this example, an n-type diamond was used as the electron supply layer (n-type semiconductor layer) 93. The n-type diamond layer was formed in the same manner as described above, except adding trimethyl phosphonate as a dopant of P to the source gas. The addition amount of phosphorus was $1\times10^{18}/cm^3$, and the thickness was about 3 μm.

Figure 10C:
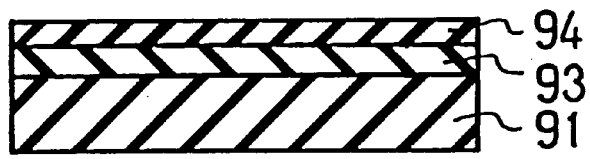

Furthermore, as shown in FIG. 10C, the p-type diamond layer 94 having a thickness of 1 μm was formed thereon by microwave plasma CVD method. The p-type diamond layer was formed in the same manner as described above.

Figure 10D:
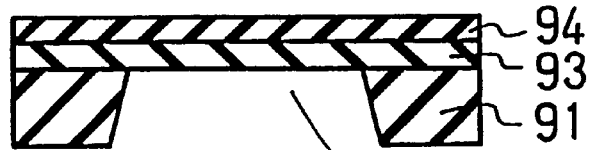

Then, as shown in FIG. 10D, a portion 96 of the lower face of the substrate 91 was removed by etching. A method for etching is not particularly limited, but suitably selected, depending on the material for the substrate 91 or the like. For example, in the case where the substrate 91 is formed of Si as in this example, a wet etching technique using $HF+HNO_3$ solution can be used.

Figure 10E:
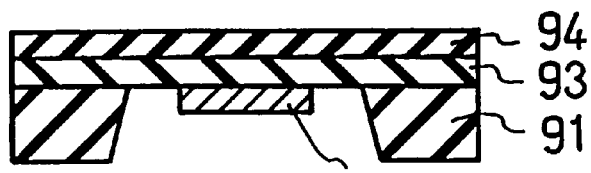

Then, as shown in FIG. 10E, an ohmic electrode layer 92 was formed on a portion of the etched portion 96 on the lower face of the substrate 91 (on the face on the side of the surface of the n-type diamond layer 93. A two-layer electrode of Au/Ti was used as a material for the electrode.

Figure 10F:
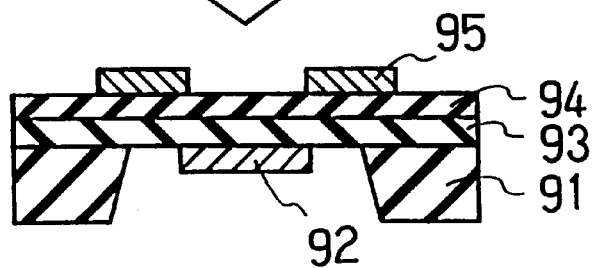

Finally, as shown in FIG. 10F, an ohmic electrode layer 95 was formed on the face on the face on the side of the surface of the p-type diamond layer 94. A two-layer electrode of Au/Ti was used as a material for the electrode.

As a result of the evaluation of the current—voltage characteristics by applying a voltage to the thus produced electron emitting device, it was confirmed that rectification was obtained, and the device operated as a pn junction diode. Furthermore, the electron emitting device was placed in a vacuum of about $10^{-9}$ Torr, and a forward bias was applied up to about 100 V. Then, electron emission characteristics were measured. As a result, the ratio of the emitted current to the diode current flowing in the device (emission efficiency) was about 0.1 to 10%. Thus, it was confirmed that electrons were emitted more efficiently than in the prior art.

It was confirmed that, in the case other than the n-type diamond layer being formed by CVD, for example, in the case where P or N ions was implanted to the i-or p-type diamond, the layer functions as an n-type diamond layer (electron supply layer).

Furthermore, in the case where the diamond was formed under other formation conditions, or a material for the substrate was changed, or in the case where a type of electrode material was changed, the same results were obtained.

EXAMPLE 6

A pin type device was formed by inserting an insulating layer such as i-type diamond between pn layers in the device structure of the pn junction type as described in Example 5. The production process thereof is the same as in Example 5, except for forming an i-type diamond layer (thickness: about 1 μm) before forming the p-type diamond layer.

As a result of the evaluation of the current—voltage characteristics by applying a voltage to the thus produced electron emitting device, it was confirmed that rectification was obtained, and the device operated as a pin junction diode. Furthermore, the electron emitting device was placed in a vacuum of about $10^{-9}$ Torr, and a forward bias was applied. Then, electron emission characteristics were measured. As a result, the ratio of the emitted current to the diode current flowing in the device (emission efficiency) was about 0.1 to 10%. Thus, it was confirmed that electrons were emitted more efficiently than in the prior art.

Furthermore, in the case where other materials such as a silicon dioxide film was used for the i-type layer, the same results were obtained.

EXAMPLE 7

As a method for controlling the surface structure of the diamond layer, a predetermined area of the diamond was irradiated with ultraviolet rays of a wavelength of 200 nm or less. First, a diamond layer in which oxygen was bonded to its surface was prepared. As a result of evaluation of the state of an electron affinity of this diamond layer, it turned out to be a positive electron affinity state. Then, a part of the diamond layer having the positive electron affinity state was irradiated with ultraviolet rays of a wavelength of 200 nm or less in a vacuum atmosphere of about $10^{-7}$ Torr or a hydrogen atmosphere. An irradiation amount of the ultraviolet rays at that time is not particularly limited, because it depends on the irradiation rate or the like. In this example, $10^{11}$ photon per sec. were irradiated for 15 minutes. As a result, it was confirmed that the bonding between carbon atoms on the uppermost surface and oxygen atoms in the area irradiated with ultraviolet rays was cleaved, and they were bonded to hydrogen atoms. In other words, it was found that the state of the electron affinity was changed from positive to negative by changing the bond state on the surface of the diamond layer. It was confirmed that, by using this process, it was possible to control the electron emission area to work as an emitter.

EXAMPLE 8

As a method for controlling the surface structure of the diamond layer, a predetermined area on the diamond layer was exposed to a plasma obtained from a hydrogen gas. First, a diamond layer in which oxygen atoms were bonded to its surface was prepared. This diamond layer was in the positive electron affinity state. Then, a portion of the diamond layer having the positive electron affinity was exposed to an ECR discharge plasma of a hydrogen gas. The irradiation time of the hydrogen plasma was 20 seconds. As a result, it was confirmed that carbon atoms on the uppermost surface in the area exposed to the hydrogen plasma were bonded to hydrogen atoms instead of the oxygen atoms. In other words, it was found that the state of the electron affinity was changed from positive to negative by changing the bond state on the surface of the diamond layer. It was confirmed that, by using this process, it was possible to control the electron emission area to work as an emitter.

Furthermore, in the case where a time period of the exposure to the ECR discharge plasma of hydrogen gas was changed, the hydrogen gas was diluted with argon or nitrogen to about 10%, or the predetermined area of the diamond layer was exposed to a hydrogen plasma formed by another method, the same results were obtained.

EXAMPLE 9

As a method for controlling the surface structure of the diamond layer, a heated diamond layer was exposed to a hydrogen gas. First, a diamond layer in which oxygen atoms were bonded to its surface was prepared. This diamond layer has the positive electron affinity, as in the case described above. The diamond layer having the positive electron affinity was placed in a cylindrical chamber in which a hydrogen gas flows, and heated to 600° C. The annealing time was 10 minutes. As a result, it was confirmed that carbon atoms on the uppermost surface of the diamond heated in the hydrogen atmosphere were bonded to hydrogen atoms instead of the oxygen atoms. In other words, it was found that the state of the electron affinity was changed from positive to negative by changing the bond state on the surface of the diamond layer. It was confirmed that, by using this process, it was possible to control the electron emission area to work as an emitter.

Furthermore, in the case where the hydrogen gas flowing in the chamber was diluted with argon or nitrogen to about 10%, or the heating temperature was varied in the range from 400 to 900° C., the same results were obtained.

EXAMPLE 10

As a method for controlling the surface structure of the diamond layer, a predetermined area on the diamond layer was exposed to a plasma obtained from of an oxygen gas. First, a diamond layer in which hydrogen atoms were bonded to its surface was prepared As a result of evaluation of electron affinity state of this diamond layer, it was confirmed that it was in the negative electron affinity state. Then, a portion of the diamond layer having the negative electron affinity was exposed to an ECR discharge plasma of oxygen gas. The irradiation time of oxygen plasma was 20 seconds. As a result, it was confirmed that carbon atoms on the uppermost surface in the area exposed to the oxygen plasma were bonded to oxygen atoms instead of hydrogen atoms. In other words, it was found that the state of the electron affinity was changed from negative to positive by changing the bond state on the surface of the diamond layer. It was confirmed that, by using this process, it was possible to control the electron emission area to work as an emitter.

Furthermore, in the case where the time period of the exposure to the ECR discharge plasma of oxygen gas was changed, the oxygen gas was diluted with argon or nitrogen to about 10%, or the predetermined area of the diamond layer was exposed to an oxygen plasma formed by another method, the same results were obtained.

EXAMPLE 11

As a method for controlling the surface structure of the diamond layer, a heated diamond layer was exposed to an oxygen gas. First, a diamond layer in which hydrogen atoms were bonded to its surface was prepared. This diamond layer has the negative electron affinity, as in the case described above. The diamond layer having the negative electron affinity was placed in a cylindrical chamber in which oxygen gas flows, and heated to 600° C. The annealing time was 10 minutes. As a result, it was confirmed that carbon atoms on the uppermost surface of the diamond heated in the oxygen atmosphere were bonded to oxygen atoms instead of the hydrogen atoms. In other words, it was found that the state of the electron affinity was changed from negative to positive by changing the bond state on the surface of the diamond layer. It was confirmed that, by using this process, it was possible to control the electron emission area to work as an emitter.

Furthermore, in the case where the oxygen gas to flow in the container was diluted with argon or nitrogen to about 10%, or the heating temperature was varied in the range from 400 to 650° C., the same results were obtained.

Industrial Applicability

As described above, according to the electron emitting device of the present invention formed using a diamond layer including a multi-layer structure having an electrode layer, an electron supply layer and a diamond layer, it is possible to efficiently supply electrons to the conduction band of the diamond by applying an electric field to the electron supply layer, and easily extract electrons out at a low voltage and a low temperature.

We claim:

1. An electron emitting device formed using a diamond layer comprising a multi-layer structure including an electrode layer, an electron supply layer including at least an insulating layer, and a diamond layer, the electron emitting device supplying electrons to the diamond layer via the electron supply layer.

2. An electron emitting device according to claim 1, comprising two electrode layers, the two electrode layers interposing at least the electron supply layer.

3. An electron emitting device according to claim 1, comprising two electrode layers, the two electrode layers interposing at least the election supply layer and the diamond layer.

4. An electron emitting device according to claim 1 comprising two electrode layers and an insulating layer, wherein the two electrode layers interpose at least the electron supply layer, the diamond layer and the insulating layer.

5. An electron emitting device according to claim 2, wherein a voltage is applied across two different electrode layers, so that an electric field is applied to the electron supply layer interposed between the two electrodes.

6. An electron emitting device according to claim 5, which operates at a voltage applied across the two different electrode layers of 100 V or less.

7. An electron emitting device according to claim 1, wherein a thickness of the diamond layer is 5 µm or less.

8. An electron emitting device according to claim 1, wherein the diamond layer comprises at least a conductive layer having an electrical resistivity of $1 \times 10^4 \Omega \cdot cm$ or less.

9. An electron emitting device according to claim 1, wherein an area of an electron emission plane of the diamond layer is 1 µm² or more.

10. An electron emitting device according to claim 1, wherein the diamond layer comprises at least a p-type diamond layer.

11. An electron emitting device according to claim 10, wherein a boron (B) atom concentration in the p-type diamond layer is $1 \times 10^{16}$ atoms/cm³ or more.

12. An electron emitting device according to claim 10, wherein an electrical resistivity of the p-type diamond layer included in the diamond layer is $1 \times 10^4 \Omega \cdot cm$ or less.

13. An electron emitting device according to claim 1, wherein an electron emission surface of the diamond layer is coated with at least one substance selected from the group consisting of Cs, Ni, Ti, W, H and amorphous-C.

14. An electron emitting device according to claim 13, wherein an attached atom density of the substance coating the electron emission face of the diamond layer is $1 \times 10^{17}$ atoms/cm² or less.

15. An electron emitting device according to claim 1, in the form of an MIS (metal-insulator-semiconductor) structure in which the electrode layer is a metal, the electron supply layer is an insulating layer, and the diamond layer includes a p-type diamond layer, wherein a forward bias is applied to the MIS structure, so as to supply electrons to the p-type diamond layer.

16. An electron emitting device according to claim 15, wherein the insulating layer of the electron supply layer is an i-type diamond layer.

17. An electron emitting device according to claim 15, wherein a thickness of the p-type diamond layer is 5 µm or less.

18. An electron emitting device according to claim 15, wherein a boron (B) atom concentration in the p-type diamond layer is $1 \times 10^{16}$ atoms/cm³ or more.

19. An electron emitting device according to claim 15, wherein an electrical resistivity of the p-type diamond layer is $1 \times 10^4 \Omega \cdot cm$ or less.

20. An electron emitting device according to claim 16, wherein an electrical resistivity of the i-type diamond layer is $1 \times 10^4 \Omega \cdot cm$ or more.

21. An electron emitting device according to claim 15, wherein an electrical resistivity of the insulating layer is $1 \times 10^4 \Omega \cdot cm$ or more.

22. An electron emitting device according to claim 15, wherein an emitter portion from which electrons are emitted is on the surface of the p-type diamond layer.

23. An electron emitting device according to claim 22, wherein carbon atoms on an uppermost surface of the p-type diamond layer are terminated with bonds to hydrogen atoms.

24. An electron emitting device according to claim 23, wherein an amount of hydrogen atoms bonded to the carbon atoms on the uppermost surface of the p-type diamond layer is $1 \times 10^{15}$ atoms/cm² or more.

25. An electron emitting device according to claim 15, wherein an emitter portion from which electrons are emitted is on a vicinity of an interface between the p-type diamond layer and a layer in contact with the p-type diamond layer.

26. An electron emitting device according to claim 15, wherein a surface conductive layer of diamond is used as the p-type diamond layer.

27. An electron emitting device according to claim 25, wherein a structure of the surface conductive layer of diamond is such that carbon atoms on an uppermost surface of the diamond layer are terminated with bonds to hydrogen atoms.

28. An electron emitting device according to claim 27, wherein an amount of hydrogen atoms bonded to the carbon atoms on the uppermost surface of the diamond layer is $1 \times 10^{15}$ atoms/cm² or more.

29. An electron emitting device according to claim 15, wherein the structure of the electron emitting device is shaped into a narrow line with a width of 5 µm or less.

30. An electron emitting device according to claim 15, wherein the diamond layer is formed by a chemical vapor deposition method.

31. An electron emitting device according to claim 1 comprising a pin structure in which the electron supply layer includes an n-type semiconductor layer and an i-type semiconductor layer, and the diamond layer includes a p-type diamond layer, a forward bias being applied to the pin structure.

32. An electron emitting device according to claim 31, wherein a thickness of the p-type diamond layer is 5 µm or less.

33. An electron emitting device according to claim 31, wherein a concentration of boron (B) atoms contained in the p-type diamond layer is $1 \times 10^{16}$ atoms/cm³ or more.

34. An electron emitting device according to claim 31, wherein an electrical resistivity of the p-type diamond layer is $1 \times 10^4 \Omega \cdot cm$ or less.

35. An electron emitting device according to claim 31, wherein an electrical resistivity of the n-type semiconductor layer is $1 \times 10^4 \Omega \cdot cm$ or less.

36. An electron emitting device according to claim 31, wherein an electrical resistivity of the i-type semiconductor layer is $1 \times 10^4 \cdot cm$ or more.

37. An electron emitting device according to claim 31, wherein an emitter portion from which electrons are emitted is on the surface of the p-type diamond layer.

38. An electron emitting device according to claim 31, wherein an emitter portion from which electrons are emitted is on a vicinity of an interface between the p-type diamond layer and a layer in contact with the p-type diamond layer.

39. An electron emitting device according the claim 31, wherein a surface conductive layer of diamond is used as the p-type diamond layer.

40. An electron emitting device according to claim 31, wherein the structure of the electron emitting device is shaped into a narrow line with a width of 5 µm or less.

41. An electron emitting device according to claim 31, wherein the diamond layer is formed by a chemical vapor deposition method.

* * * * *